April 13, 1943.   K. MATSUNAGA   2,316,446
HOE HANDLE ATTACHMENT
Filed May 13, 1941
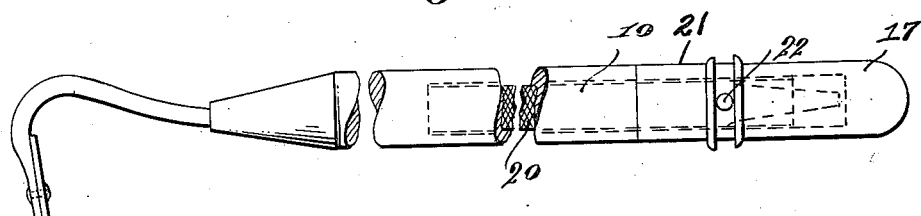
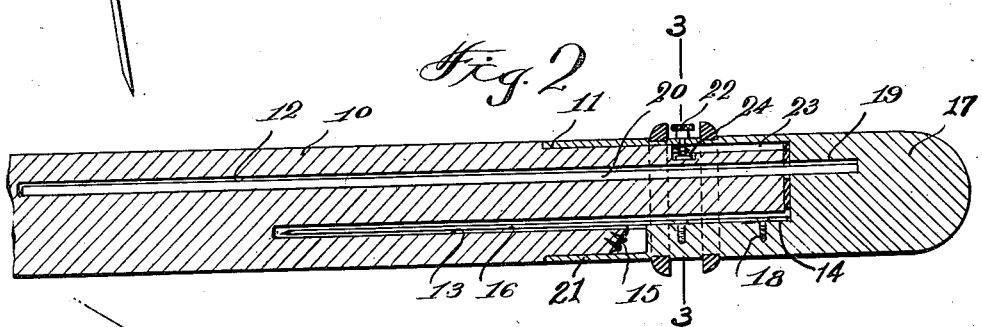
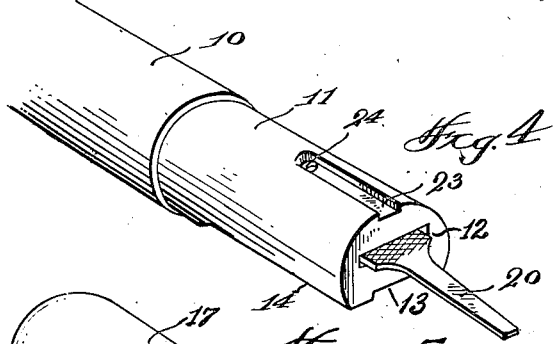
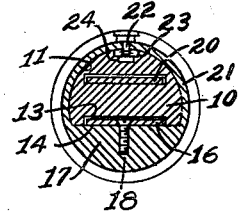
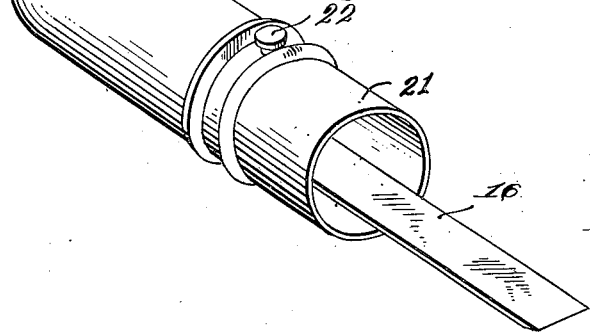
Kaoru Matsunaga
INVENTOR
BY Victor J. Evans & Co.
ATTORNEYS Patented Apr. 13, 1943

2,316,446

UNITED STATES PATENT OFFICE 2,316,446

HOE HANDLE ATTACHMENT

Karou Matsunaga, Kalaheo, Kauai, Territory of Hawaii

Application May 13, 1941, Serial No. 393,286

3 Claims. (Cl. 97—71.1)

This invention relates to hoe handles and more particularly to those in which tools for cleaning the instrument are contained therein.

The advantages in the provision of cleaning and sharpening tools for a hoe incorporated as a part of the implement, for handiness, are obvious. I realize that several devices have been developed to accomplish this, but, so far as I am aware, no one has utilized the specific advantageous combination and arrangement of parts of that embodied in my invention.

The object of my invention is convenience and handiness in hoe cleaning implements.

Another object is a means for combining such implements with a hoe handle.

Still another object is an economically manufactured and easily usable device for accomplishing the above results.

These and other objects may be accomplished by my invention which embodies among its features a removable section on the end of a hoe handle, a ferrule on the section fitting on a reduced portion of the handle, a scraper on the section fitting into a recess in the handle, a recess in the section coacting with a recess in the handle to form a container for a file, and a releasable catch on the section to hold it on the handle.

Other objects and features may become evident from the following disclosure when taken in connection with the accompanying drawing in which:

Figure 1 is a side view, foreshortened, of a hoe embodying my invention,

Figure 2 is a cross-section of the section where it fits on the handle,

Figure 3 is a cross-section taken on line 3—3 of Figure 2, and

Figure 4 is a perspective view of one portion of the handle.

Figure 5 is perspective view of the other portion of the handle.

Referring to the drawing in detail, the hoe handle 10 has a reduced portion 11 to receive the ferrule 21, and there are recesses 12 and 13 in the handle to receive a file and scraper respectively. One side of the handle has a cut away portion as at 14, adjacent the scraper recess 13, and there is a blade 15 affixed to the edge of this recess to provide a cleaning means for the scraper.

Said scraper 16, is carried by section 17, screwed to an extending side thereof as at 18. This extension fits into the cut away portion 14 and the scraper 16 fits into the recess 13, bearing against the blade 15. There is also a recess 19 in the section which coincides with the recess 12 to form a pocket for the file 20. The section is held on the handle by a ferrule 21 which fits reduced portion 11, and a spring lug 22, of conventional construction, which operates in groove 23 and socket 24 to provide a manually releasable means to hold the section on the handle.

In operation, when the section is attached, the hoe can be handled in the conventional manner. If it is desired to clean the hoe the section may be removed by disengaging the spring lug 22, and the scraper 16 is used with the section acting as a handle. Blade 15 acts to clean off the scraper. Likewise when the section is removed the file, stored in the pockets 19 and 12, may be removed.

Although a preferred embodiment of my invention is described herein I do not wish to be limited thereto but only by the scope of the appended claims.

What is claimed is:

1. In a device of the class described, a hoe handle, a section at the end of the handle detachable therefrom and ferrule means thereon to fit the handle, an extension on one side of the section, a cut away portion on the handle to receive the extension, a scraper on the section and a pocket in the handle to receive the scraper.

2. In a device of the class described, a hoe handle, a section at the end of the handle detachable therefrom and ferrule means thereon to fit the handle, an extension on one side of the section, a cut away portion on the handle shaped to receive the extension, a scraper secured to the extension and a pocket adjacent the cut away portion to receive the scraper.

3. In a device of the class described, a hoe handle, a section at the end of the handle detachable therefrom and ferrule means thereon to fit the handle, an extension on one side of the section, a cut away portion on the handle to receive the extension, a scraper secured to the extension, a pocket adjacent the cut away portion to receive the scraper, and a blade on the cut away portion positioned to contact the scraper when it is inserted in the pocket.

KAORU MATSUNAGA.